(12) United States Patent
Tanaka et al.

(10) Patent No.: US 9,340,130 B2
(45) Date of Patent: May 17, 2016

(54) VEHICLE SEAT

(71) Applicant: TACHI-S CO., LTD., Tokyo (JP)

(72) Inventors: Koji Tanaka, Tokyo (JP); Hiroshi Nozu, Tokyo (JP); Hiromasa Tanji, Tokyo (JP); Atsushi Ichida, Tokyo (JP); Hideo Tobata, Sagamihara (JP); Atsushi Koike, Iruma (JP)

(73) Assignee: TACHI-S CO., LTD. (JP)

( * ) Notice: Subject to any disclaimer, the term of this patent is extended or adjusted under 35 U.S.C. 154(b) by 0 days.

(21) Appl. No.: 14/282,413

(22) Filed: May 20, 2014

(65) Prior Publication Data

US 2014/0346830 A1 Nov. 27, 2014

(30) Foreign Application Priority Data

May 22, 2013 (JP) ................................. 2013-108069
Jul. 16, 2013 (JP) ................................. 2013-147228

(51) Int. Cl.
*B60N 2/427* (2006.01)

(52) U.S. Cl.
CPC ........ *B60N 2/42763* (2013.01); *B60N 2/42718* (2013.01); *B60N 2/42781* (2013.01)

(58) Field of Classification Search
CPC . B60N 2/42763; B60N 2/42781; B60N 2/427
USPC .................... 297/311, 322, 344.15
See application file for complete search history.

(56) References Cited

U.S. PATENT DOCUMENTS

| | | | | |
|---|---|---|---|---|
| 5,908,219 A * | 6/1999 | Bohmler | ..................... | 297/216.1 |
| 6,050,635 A * | 4/2000 | Pajon et al. | ................ | 297/216.1 |
| 6,746,077 B2 * | 6/2004 | Klukowski | ................ | 297/216.1 |
| 6,755,469 B2 * | 6/2004 | Akaike et al. | ............ | 297/344.15 |
| 6,773,069 B1 * | 8/2004 | Kaneko et al. | ........... | 297/344.17 |
| 7,300,108 B2 * | 11/2007 | Canteleux | ................ | 297/344.15 |
| 8,177,280 B2 * | 5/2012 | Yamada et al. | ............ | 296/65.05 |
| 8,585,139 B2 * | 11/2013 | Masutani | .................... | 297/216.2 |
| 8,596,721 B2 * | 12/2013 | Ozawa | ...................... | 297/344.15 |
| 8,616,636 B2 * | 12/2013 | Arata | ....................... | 297/216.16 |
| 2005/0242634 A1 * | 11/2005 | Serber | ........................ | 297/216.1 |

FOREIGN PATENT DOCUMENTS

| | | |
|---|---|---|
| JP | 2002-46513 A | 2/2002 |
| JP | 2004-237820 A | 8/2004 |
| WO | 01/41525 A1 | 6/2001 |

OTHER PUBLICATIONS

Extended European Search Report corresponding to Application No. 14168488.6-1758; Date of Mailing: Sep. 15, 2014.

\* cited by examiner

*Primary Examiner* — Phi A

(74) *Attorney, Agent, or Firm* — Cantor Colburn LLP

(57) ABSTRACT

Links are provided, each between one of the side frames of the seat cushion and the support member, and can be swung. A band extends at a substantially center part of the seat cushion and between the side frames, and is provided beneath the seat pad. One end of the band is secured to the top of one side frame, and the other end (free end) hangs over the top of the other side frame. The free end of the band further extends via the direction changing member provided on the side frame, first passing by a first relay point, i.e., the axle of the link provided on the side frame, and then passing by a second relay point, i.e., the axle of the link provided on the support member. At an emergency, the traction device pulls and stretches the band.

8 Claims, 7 Drawing Sheets

FIG.1A
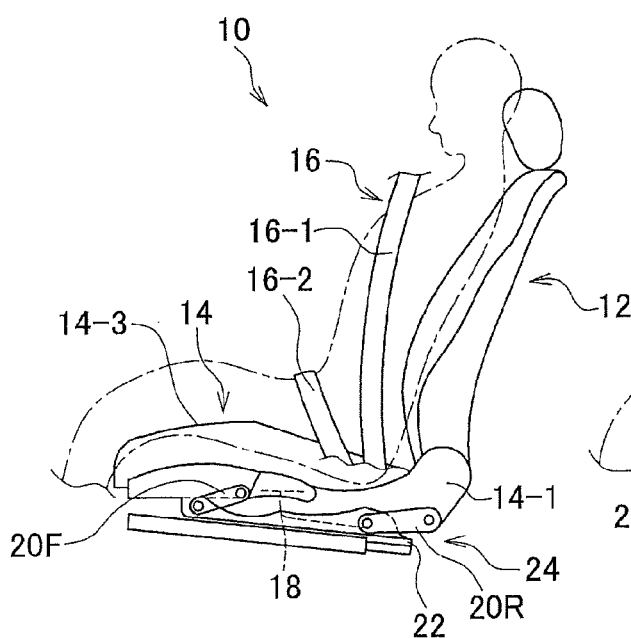
FIG.1B
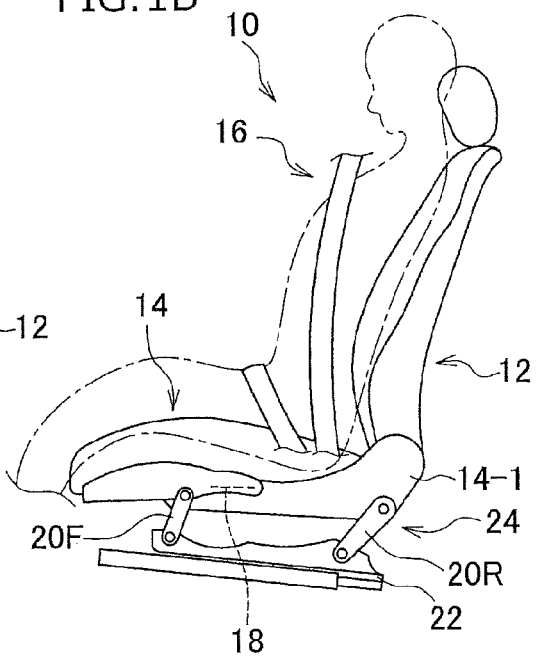
Fr ← → Rr
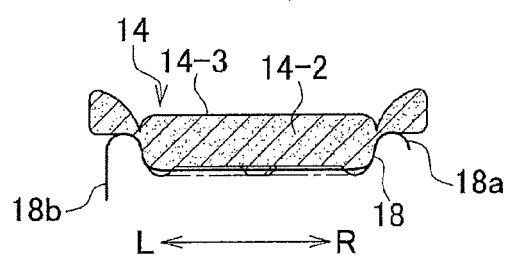
FIG.1C
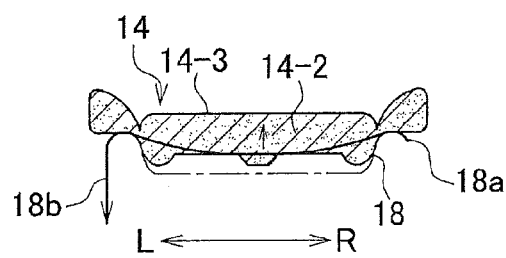
FIG.1D

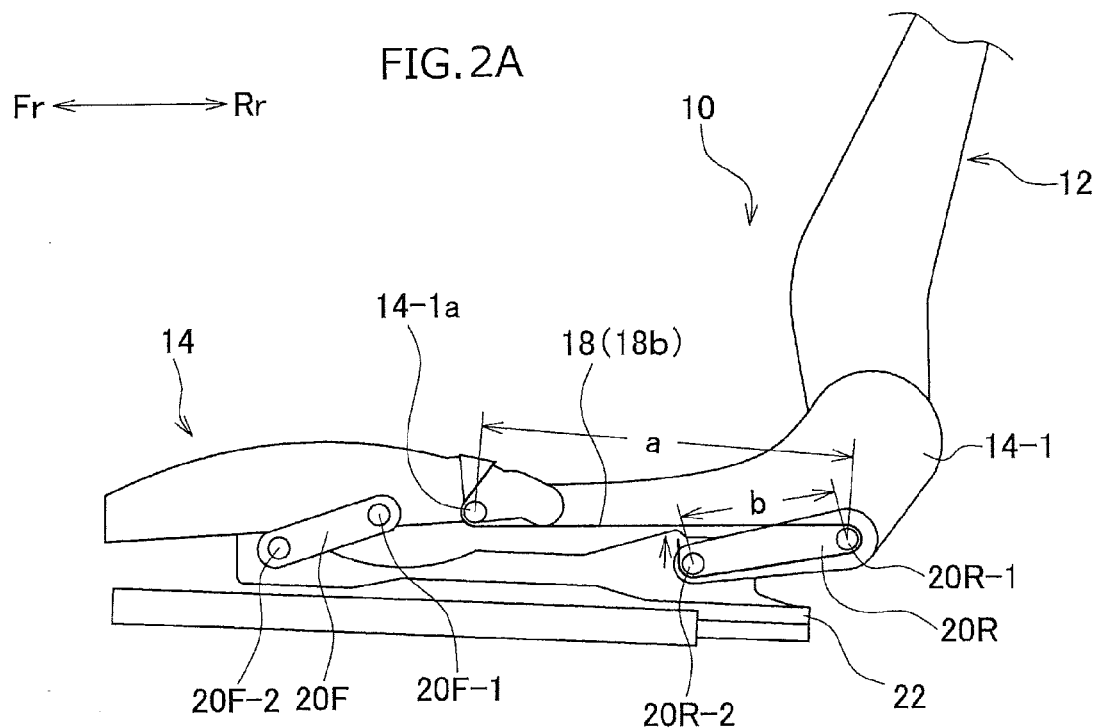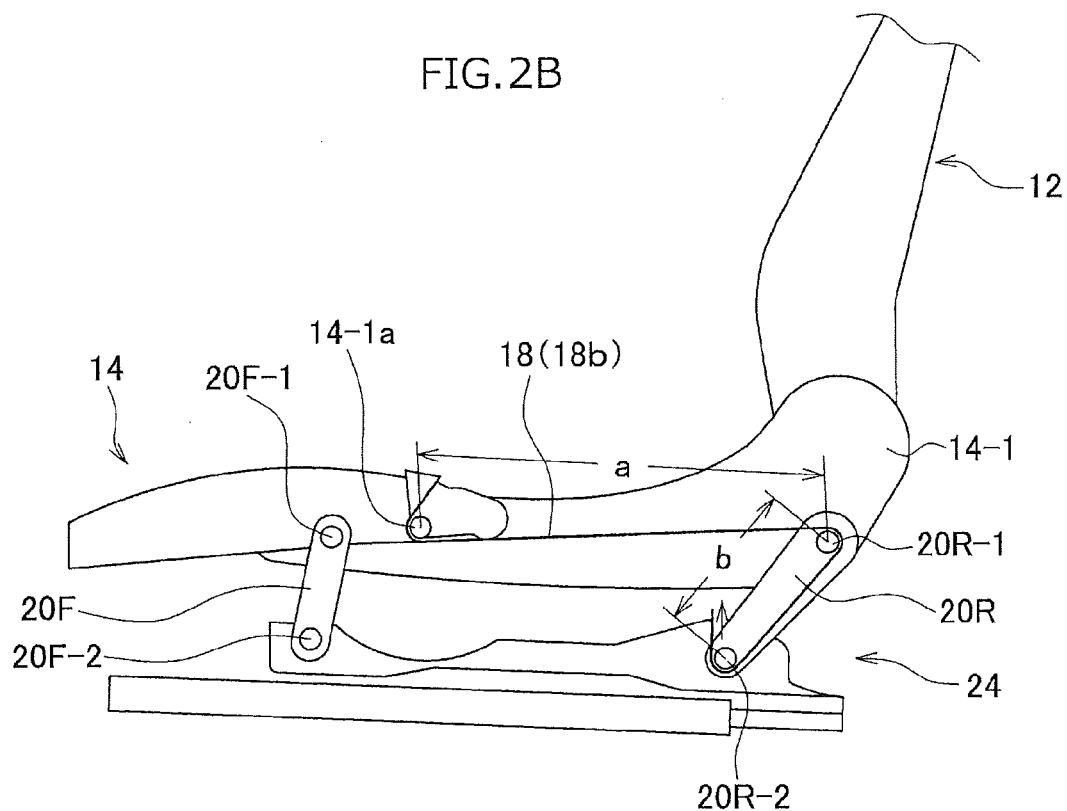

VEHICLE SEAT

CROSS-REFERENCE TO RELATED APPLICATIONS

This application is based upon and claims the benefit of priority from the prior Japanese Patent Applications Nos. 2013-108069 and 2013-147228, filed May 22 and Jul. 16, 2013, respectively, the entire contents of which are incorporated herein by reference.

BACKGROUND OF THE INVENTION

1. Field of the Invention

This invention relates to a vehicle seat designed to control a so-called submarine phenomenon, i.e., forward motion the occupant wearing the seat belt may undergo at, for example, an emergent halt of the vehicle.

2. Description of the Related Art

Most vehicle seats have a three-point holding seat belt configured to hold the occupant at three points, i.e., the left or right shoulder, the left side of the waist, and the right side of the waist. The three-point holding seat belt has an upper-half webbing (i.e., shoulder webbing) and a lower-half webbing (lap webbing). The upper-half webbing may be wrapped around the occupant and extend from one shoulder to the left and right sides of the waist, and the lower-half webbing may be wrapped around the occupant's waist and secured. The webbings thus cooperate to hold the occupant to the vehicle seat.

If the vehicle is abruptly decelerated, is suddenly stopped or collides with the vehicle running before it, inertia will act on the occupant to move him or her forward. In most cases, the seat belt prevents such a forward motion of the occupant, in spite of the inertial force generated in such an event. However, the seat belt may fail to function well if the occupant undergoes a so-called submarine phenomenon, in which the occupant's buttocks slide forwards on the seat, while sinking in the seat cushion.

A configuration is known, which is designed to control the submarine phenomenon (i.e., forward motion of the buttocks of the occupant wearing the seat belt, at such an emergency). In this configuration, a control member extends beneath the seat pad, between the left and right side frames, and below that part of the seat cushion which is almost at the middle in the fore-to-aft direction of the vehicle. The control member is positioned low, making the occupant feel comfortable. At an emergency, the control member rises, pushing up the seat pad in front of the occupant's buttocks. So pushed up, the seat pad controls the submarine phenomenon.

JP 2002-046513A, for example, discloses a vehicle seat, in which a cross member having a foldable part extends between the left and right side frames of the seat cushion. The foldable part of the cross member is bent with the pressure the occupant applies to the cross member. When the occupant's buttocks move forward at an emergency, however, the foldable part rises, pushing up the seat pad and thus controlling the submarine phenomenon.

Further, JP 2004-237820A discloses a vehicle seat, in which an elastic band used as control member extends beneath the seat pad and between the left and right side frames of the seat cushion. A traction device having an inflator is connected to an end of the elastic band hanging along the side frames. At an emergency, the inflator causes the traction device to pull the ends of the elastic band in both the leftward direction and the rightward direction. The traction device therefore stretches the elastic band between the side frames, pushing up the seat pad at the lower surface. As a result, the seat pad rises in front of the occupant's buttocks, controlling the submarine phenomenon.

In the vehicle seat disclosed in JP 2002-046513A, the cross member is hard, formed of, for example, a steel plate. Therefore, if the cross member is positioned near the upper surface of the seat pad, it can push the seat pad upwards much enough to control the submarine phenomenon at an emergency. While the vehicle is running in normal state, however, the occupant perceives the existence of the cross member and feels somewhat uncomfortable. In order to make the occupant comfortable while the vehicle is running in normal state, the cross member may be arranged above the seat pad. If so arranged, however, the cross member cannot push up the seat pad sufficiently, possibly failing to control the submarine phenomenon at an emergency.

In the vehicle seat disclosed in JP 2004-237820A, an elastic band, such as elastomer sheet, is used as control member. The band can hardly be perceived through the seat pad even while the vehicle is running in normal state. Since the band is arranged on the lower surface of the seat pad, it is sufficiently spaced from the upper surface of the seat pad. This ensures comfort to the occupant. At an emergency, the traction device pulls the band, fast stretching and lifting the band. The band can therefore sufficiently control the submarine phenomenon.

A type of a vehicle seat is known, which comprises a seat cushion and a seat lifter. The seat lifter includes a pair of front links and a pair of rear links. All links (i.e., height links) extend between, and are coupled to, side frames and a car-floor side support member. The seat lifter can therefore move the seat cushion up and down.

The elastic band extending between the side frames of the seat cushion is used as control member and is stretched by the traction device mounted between the left and right support member. This configuration will be complicated if the seat cushion is moved up and down.

That is, in the vehicle seat having a traction device secured to the support member, the distance between the seat cushion and each support member will change as the seat lifter moves the seat cushion up or down. More precisely, the distance between the top of side frame and the traction device will change. The band will change in length because it extends between the side frame and the traction device and hangs along the side frame.

Therefore, the band must be fed (to lift the seat cushion) or pulled (to lower the seat cushion) and must thereby be adjusted in length immediately at an emergency, regardless of the position the seat cushion assumes. Unless the length of the band is precisely adjusted as the seat cushion is lifted or lowered, the band is pulled, pushing up the seat pad and inevitably making the occupant feel uncomfortable, while the vehicle is running in normal state. At an emergency, the band may be stretched with some delay, possibly failing to control the submarine phenomenon.

It is not easy to adjust the length of the band as the seat cushion is lifted or lowered. The band, which is pulled or stretched to control the submarine phenomenon, needs to be secured to the seat cushion only (more precisely, to the side frame of the seat cushion), no matter whether the vehicle seat has a seat lifter or not. The position of the traction device is inevitably limited.

Further, the band must be stretched without twisting, to pull up the seat pad on an emergency, at the part lying in front of the occupant's buttocks, thereby to control the submarine phenomenon. If the band twists as it is pulled, it cannot reliably transmit a pushing force to the seat pad even if it is well stretched. If this is the case, the seat pad can hardly be pulled up to assume a specific shape, and the submarine phenomenon may not be controlled.

The band can be stretched without twisting if it is pulled in the direction it extends between the left and right side frames. In the vehicle seat disclosed in JP 2004-237820A, the traction device is arranged below the band and in parallel to the band. Thus, the traction device pulls the band in the same direction the band extends.

In order to pull the band in the direction the band extends, the position of the traction device is limited.

SUMMARY OF THE INVENTION

The first object of the invention is to provide a vehicle seat of simple configuration, in which a band is pulled and stretched even if the seat cushion moves up or down, thereby controlling the submarine phenomenon.

The second object of the invention is to provide a vehicle seat of simple configuration, which can prevent a band from twisting without limiting the position of the traction device.

To achieve the first object, this invention uses a direction changing member secured to one of the side frames of the seat cushion, and one end of the band extends, first passing by the direction changing member and then passing by first and second relay points that are axles (first and second axles positioned on a link) coupling the side frames to the support member.

In this invention, a seat lifter is used to lift and lower the seat cushion, with respect to the support member provided on a car floor. The seat cushion has a seat pad, the left and right side frames supporting seat pad at the left and right sides, respectively. Beneath the seat pad, the band extends between the left and right side frames. One end the band is fastened to one side frame. The other end of the band extends via the direction changing member and is connected to a traction device. At an emergency, the traction device pulls the band, stretching the same between the side frames. So stretched, the band pushes up the seat pad from below. The seat lifter includes links coupling a first axle provided on the side frames and swung around a second axle provided on the support member. As the links are swung around the second axle, the seat cushion is lifted and lowered with respect to the support member. The other end of the band, extending from the direction changing member, is turned back at the first and second relay points, i.e., the first and second axles, and is connected to the traction device.

To achieve the second object, this invention uses a direction changing member provided on one side frame and aligned with that part of the band, which extends between the left and right frames, and the end of the band passes by the direction changing member and then extends along the side frame.

That is, a vehicle seat according to this invention comprises has left and right side frames and a band extending between the side frames. At an emergency, the band is pulled and stretched between the side frames, thereby to control the forward and sinking motion of the occupant wearing the seat belt. The vehicle seat further has a direction changing member, which is provided on one side frame and aligned with that part of the band, which extends between the left and right frames. The end of the band, which is pulled, extends along the side frame after passing by the direction changing member. The direction changing member comprises a main rod and a sub-rod. The main rod includes an upper part and a slant part coupled to one end of the upper part, and the sub-rod extends parallel to the upper part of the main rod, providing a gap through which the band passes without falling off. The slant part of the main rod has a straight turning-back section for turning back the band passing through the gap between the sub-rod and the upper part and of the main rod.

BRIEF DESCRIPTION OF THE DRAWINGS

FIG. 1A is a partly sectional, side view of a vehicle seat according to one embodiment (First Embodiment) of this invention, showing the seat cushion on a lower position;

FIG. 1B is a partly sectional, side view of the vehicle seat according to the embodiment, with the seat cushion lifted from the lower position to an upper position;

FIG. 1C is a sectional view of the seat cushion of the vehicle seat, which the band is not pulled and stretched between the side frames;

FIG. 1D is a sectional view of the seat cushion of the vehicle seat, which the band is pulled and stretched between the side frames;

FIG. 2A is a side view of the vehicle seat, showing the seat cushion on the lower position;

FIG. 2B is a side view of the vehicle seat, showing the seat cushion lifted from the lower position to the upper position;

DETAILED DESCRIPTION OF THE INVENTION

Embodiment 1

Figure 3:
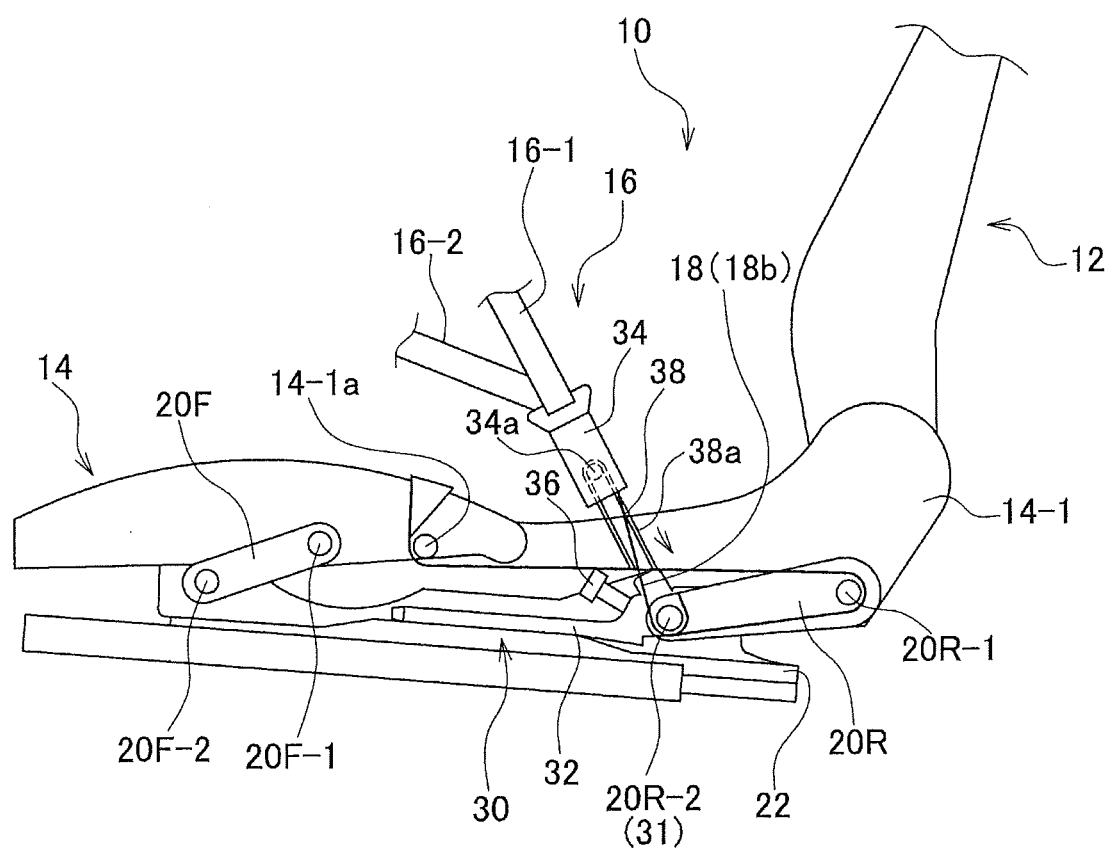
FIG. 3 is a side view of the vehicle seat having a buckle pre-tensioner used as a traction device.

A vehicle seat according to the first embodiment of this invention will be described in detail, with reference to FIGS. 1A to 1D, FIGS. 2A and 2B and FIG. 3. In these figures, Fr and Rr indicate the forward and backward directions with respect to the occupant seated in the driver seat, and L and R indicate the leftward and rightward directions with respect to the occupant.

As shown in FIG. 1B, the vehicle seat 10 comprises a seat back 12 and a seat cushion 14. A seat belt 16 is secured to the vehicle seat 10. The seat cushion 14 comprises a cushion frame, a seat pad 14-2 and a trim cover 14-3. The cushion frame includes left and right side frames 14-1. The seat pad 14-2 is made of foamed material such as urethane foam and covers the cushion frame. The trim cover 14-3 covers the seat pad 14-2. The seat back 12 has a configuration similar to that of the seat cushion 14.

The seat belt 16 is, for example, a three-point holding type (also known as three-point seat belt). The three-point seat belt 16 has an upper-half webbing (shoulder webbing) 16-1 and a lower-half webbing (lap webbing) 16-2. The upper-half webbing 16-1 may be wrapped down slantwise the occupant's shoulder, to hold the occupant to the vehicle seat 10.

As shown in FIG. 1C, the seat pad 14-2 has a cross section shaped like U, having both side parts raised higher than the center part on which an occupant may sit. A band 18 is provided at the center part of the seat cushion 14, extending between the left and right side frames 14-1 and below the seat pad 14-2. The band 18 is, for example, a belt (webbing), which is made, like a seat belt, by waving polyester fibers that excel in tensile strength.

As shown in FIG. 2A and FIG. 2B, the vehicle seat 10 has two pairs of links, each including a front link 20F and a rear link 20R. These links 20F and 20R constitute a seat lifter (lift mechanism) 24. The seat lifter 24 is arranged between the seat cushion 14 and a support member (e.g., seat raiser) 22, provided on a car floor, for example, via slide rail devices. Each front link 20F is coupled to the side frame 14-1 by an axle 20E-1 and to the support member 22 by an axle 20E-2. Each rear link 20R is coupled to the side frame 14-1 by an axle 20R-1 and to the support member 22 by an axle 20R-2. Therefore, the front link 20F and the rear link 20R can be swung by the axles 20E-2 and 20R-2. As the front links 20F and rear links 20R are swung around the axles 20E-2 and 20R-2, the seat cushion is lifted or lowered.

The basic configuration of the seat lifer (lift mechanism) 24 is known in the art, not characterizing the present invention, and shall not be described in detail. If a lever (not shown) is operated, the seat lifter will lift or lower the seat cushion 14. More specifically, if the lever is pulled up, the pinion (not shown) coaxial with the lever is rotated, driving the sector gear (not shown) in mesh with a pinion gear. As the sector gear is so driven, the rear links 20R are swung, together with the front links 20F. As a result, the seat cushion 14 is lifted or lowered.

The band 18 is fastened at one end 18a to the top of the right side frame 14-1. The other end (free end) 18b of the band 18 extends over the top of the left side frame, hangs down and is connected to a traction device. The band 18 can therefore be pulled and stretched by the traction device. In this embodiment, that end (free end) of the band 18, which is pulled, hands down over the top of the left side frame 14-1. The left side frame 14-1 may have a notch in the top, or a window (slit) in the part immediately below the top. In either case, the band 18 may hang down, passing through the notch or the window.

In the normal state, the band 18 is positioned blow the seat pad 14-2 as shown in FIG. 1C, no matter whether the seat cushion 14 takes a lower position as shown in FIG. 1A or an upper position as shown in FIG. 1B. At an emergency, such as a collision, the band 18 is pulled at the end (free end) 18b and is stretched between the left and right side frames 14-1, pushing up the seat pad 14-2 as shown in FIG. 1D in the direction of the arrow. As a result, the seat pad 14-2 rises at the part in front of the occupant's buttocks, forming a barrier. The barrier controls the submarine phenomenon on the occupant.

As seen from FIG. 2A and FIG. 2B, a direction changing member 14-1a is provided on the left side frame 14-1, right below the band 18 hanging down over the top of the side frame. The direction changing member 14-1a is, for example, a pin secured to the side frame 14-1. As shown in FIG. 3, a seat belt buckle (buckle) 34 is secured to the support member 22, at the back of the direction changing member 14-1a.

The free end 18b (i.e., end pulled up) of the band 18, hanging down from the top of the left side frame 14-1, is wound at the front circumference of the direction changing member 14-1a provided on the side frame and right below the band 18, and is changed in direction, from the up-down direction to the front-rear direction. The free end 18b of the band 18, so changed in direction, extends backwards along the side frame.

After passing the direction changing member 14-1a, the free end 18b of the band 18 is wound downwards around the rear circumference of the axle 20R-1 of rear link provided on the side frame 14-1, which is used as first relay point. The band 18 then extends in front of the side frame.

The free end 18b of the band 18, extended around the first relay point (i.e., axle 20R-1, i.e., first axle, of rear link provided on the side frame) is then wound upwards around the lower circumference of the axle 20R-2 of the rear link provided on the support member 22. The free end 18b is then turned back at the second axle 20R-2 used as second relay point, and is thereby extended.

The free end 18b of the band 18, extended around the second relay point (i.e., axle 20R-2 of the rear link 20R provided on the support member 22) is pulled and stretched by the traction device 30 at an emergency such as collision. As the traction device 30 for pulling the band 18, the buckle pre-tensioner can be used.

The direction changing member 14-1a is a pin secured to the left side frame 14-1 as shown in FIG. 3. The member 14-1a is not limited to a pin. For example, the notch or slit made in the side frame may be used as direction changing means, and the free end 18b of the band 18 may be extended therefrom.

The buckle pre-tensioner 30 used as traction device for pulling the free end 18b of the band 18 is a well-known type. At an emergency such as collision, the buckle pre-tensioner actuates an inflator 36. So actuated, the inflator 36 pulls the seat belt buckle 34. In this embodiment, the buckle pre-tensioner 30 is fastened to the support member 22 by a fastening axle 31, which is coaxial with the axle 20R-2 of the rear link.

As shown in FIG. 3, the pre-tensioner 30 comprises a cylinder 32, an inflator 36, and a piston (not shown). The inflator 36 communicates with the cylinder 32. At an emergency such as collision, the inflator 36 generates high-pressure gas and supplies the gas to the cylinder. The piston is provided in the cylinder 32 and can slide in the cylinder. The pre-tensioner 30 is arranged on the support member 22. The buckle 34 is coupled to the pre-tensioner 30 by a wire 38. One end of the wire 38 is fastened to the pre-tensioner 30. The other end of the wire 38 is wrapped around a pin 34a secured to the buckle 34, led back to the pre-tensioner 30 and coupled to the end (i.e., right end in FIG. 3) of the piston. The free end 18b of the band 18 is coupled to that part of the wire 38, which has been wrapped around the pin 34a and led back to the pre-tensioner 30. Right below the buckle 34, the band 18 is connected to, for example, that part 38a of the wire 38, which is led back to the pre-tensioner 30.

At an emergency such as collision, the inflator 36 instantaneously operates, generating high-pressure gas. The high-pressure gas draws the piston into the cylinder 32. Connected to the piston, the part 38a of the wire 38 is pulled in the direction of the arrow shown in FIG. 3. As a result, the buckle 34 and the free end 18b of the band 18 are pulled at the same time.

In FIG. 3, that part of the band 18, which extends between the direction changing member 14-1a and the first relay paint 20R-1, appears crossing that part of the band 18, which extends between the second relay point 20R-2 and the part 38a of the wire 38. However, these parts of the band 18 are spaced apart, and would not contact each other. Hence, they do not undergo mutual friction even if the pre-tensioner 30 pulls the free end 18b of the band 18.

If the buckle 34 is pulled, the shoulder webbing 16-1 and the lap webbing 16-2 are pulled, holding the occupant on the vehicle seat 10. If the band 18 (more precisely, free end 18b of the band) is pulled at the same time the buckle 34 is pulled, the band 18 is stretched between the left and right side frames 14-1, pushing up the seat pad 14-2 (see FIG. 1D) in front of the occupant's buttocks, forming a barrier. The barrier controls the submarine phenomenon at an emergency.

As shown in FIG. 2A and FIG. 2B, the seat cushion 14 changes in position (more precisely, in height) as it is lifted or lowered. If the seat cushion 14 changes in position, however, the distance "a" between the direction changing member 14-1a and the first relay point remains unchanged. This is because both the direction changing member 14-1a and the first relay point (i.e., the first axle, or the axle 20R-1 of the rear link) are provided on the side frame 14-1 of the seat cushion.

Moreover, the distance "b" between the first and second relay points remains unchanged even if the rear link 20R is swung around the second relay point to lift or lower the seat cushion. This is because the first and second relay points are defined by the axles 20R-1 and 20R-2 (first and second axles) of the rear link.

The direction changing member 14-1a is provided on the side frame 14-1, and the pre-tensioner 30 and second relay point 20R-2 are provided on the support member 22. Therefore, the distance from the top of the side frame 14-1 to the direction changing member 14-1a remains unchanged, and the distance from the second relay point 20R-2 to the traction device (pre-tensioner) 30 remains unchanged.

Thus, the length of that part of the band 18, which extends between the top of the side frame 14-1 and the traction device 30 (i.e., length of the band hanging down along the side frame of the seat cushion) does not change even if the seat cushion 14 is lifted and changes in position. The band 18 can therefore be immediately pulled and stretched at an emergency. Nor is it necessary to adjust the length of the band 18 as the seat cushion is lifted or lowered. The configuration that pulls and stretches the band to control the submarine phenomenon can therefore be applied to any vehicle seat that has a seat lifter.

That is, the submarine phenomenon can be controlled by a simple configuration in which the direction changing member 14-1a is provided on the side frame 14-1, the first and second axles of a rear link are used as the first and second relay points 20R-1 and 20R-2, and the free end 18b of the band 18 extends to the traction device 30 via the direction changing member 14-1a and, the first and second relay points 20R-1 and 20R-2.

As the seat lifter 24 lifts the seat cushion 14 in normal state, the distance between the seat cushion 14 and the support member 22 changes. Nonetheless, the length of the band 18 does not change at all, and the band 18 is neither pulled nor stretched between the left and right side frames. Even if the seat cushion 14 is lifted in normal state, the band 18 stays below the seat pad 14-2 (or stays at initial position), never to push up the seat pad. This makes the occupant feel comfortable.

Since the band 18 remains unchanged in length even if the distance between the seat cushion 14 and the support member 22 changes, the traction device 30 can be provided at the seat cushion 14 or the support member 22 (e.g., seat raiser). The position at which the traction device 30 should be provided is not limited.

Even if the seat cushion 14 is lowered, the distance between the seat cushion 14 and the support member 22 does not change at all. The band 18 is therefore never slackened, and the traction device 30 never pulls or stretches the band 18 with any delay.

The pre-tensioner is used as the tracking device 30 for pulling the free end 18b of the band 18, and any other tracking member need not be used. This helps to simplify the configuration. In addition, the band 18 and the buckle 34 are simultaneously pulled at an emergency, successfully controlling the submarine phenomenon.

In Embodiment 1, the free end 18b of the band 18 is connected to that part 38a of the wire 38, which is led back to the pre-tensioner 30. This connection is, however, unnecessary if the pre-tensioner 30 pulls the band 18 at the same time it pulls the buckle 34.

The free end 18b of the band 18 may be connected, not to the part 38a of the wire 38, but to the piston that can slide in the cylinder 32. In this case, the band 18 can be pulled at the same time the buckle 34 is pulled. The band 18 can be easily connected to the piston, only if a pin is provided at an appropriate position on the support member 22 and if the band 18 extends from the pin used as a relay point.

Moreover, the direction changing member 14-1a secured on the top-end of the left side frame 14-1 may change the direction of the free end 18-1 from the left-right direction to the front-rear direction directly.

Embodiment 2

A vehicle seat according to another embodiment (Embodiment 2) of this invention will be described with reference to FIG. 4.

The components identical to those of the embodiment (Embodiment 1) described above are designated by the same reference numbers, and will not be described. The components different from those of the above-described embodiment (Embodiment 1) will be described in the main.

Figure 4:
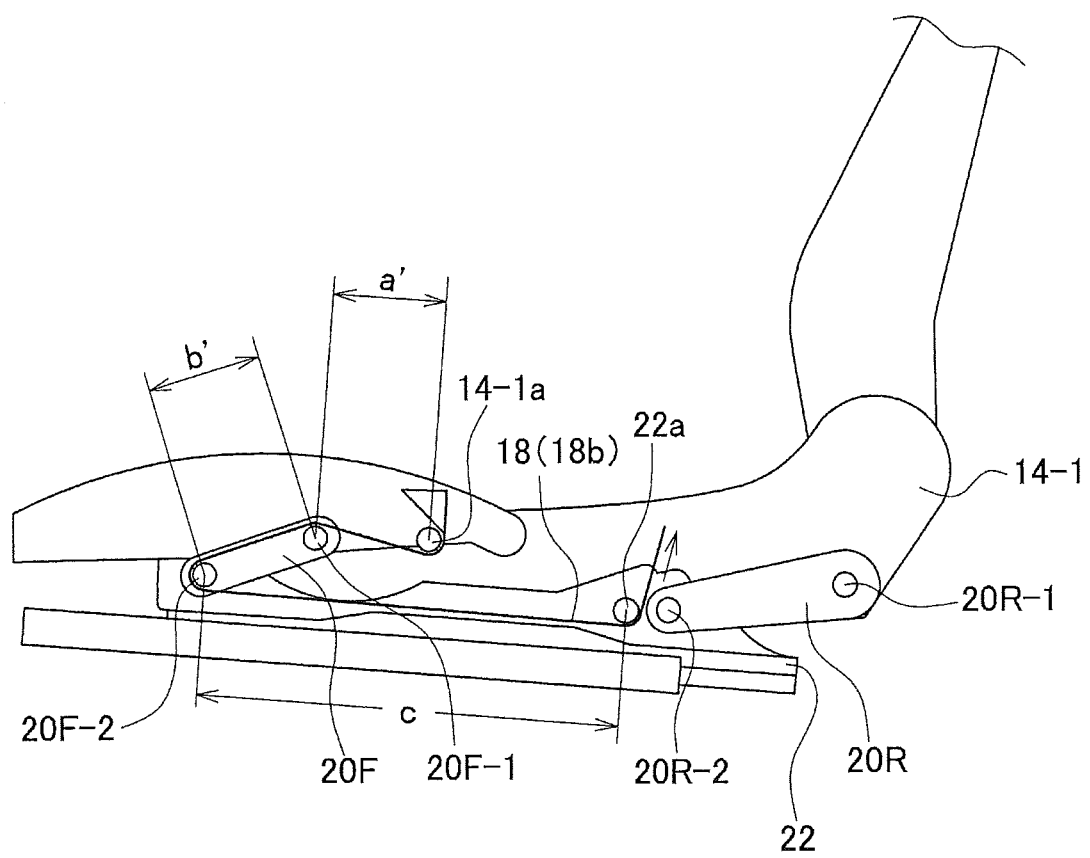
FIG. 4 is a side view of a vehicle seat according to another embodiment (Embodiment 2) of this invention, and corresponds to FIG. 2A.

Embodiment 2 shown in FIG. 4 differs from Embodiment 1 in that the axles 20E-1 an 20E-2 of the front link 20F are used as first and second axles, i.e., first and second relay points.

Like the axles 20R-1 and 20R-2 of the rear link 20R, the axles 20E-1 and 20E-2 of the front link 20F are provided on the side frame 14-1 of the seat cushion and the support member 22, respectively.

The free end 18b of the band 18 between the left and right side frames 14-1 extends from the top of either side frame, and is wrapped around the rear circumference of the direction changing member 14-1a. The free end 18b of the band 18 is further wrapped from the back, around the upper circumference of the axle 20E-1 of the front link as the first relay point. The free end 18b is therefore folded back at the direction changing member 14-1a and then extends forward from the side frame.

The free end 18b of the band 18 extending forward, passing the first relay point 20E-1 (the first axle), is wrapped downward around at the front circumference of the axle 20E-2 (the second axle) provided on the support member 22 and used as the second relay point. The free end 18b of the band 18 is thereby turned back at the second relay point 20E-2 and then extends rearward from the second relay point.

The band 18 (more precisely, free end 18b) can hardly be stretched from the second relay point (the axle 20E-2 of the front link, i.e., the second axle) to that part 38a of the wire 38, which is led back to the traction device 30 (pre-tensioner) as shown in FIG. 3. In view of this, a pin 22a is secured to the support member 22, in front of the axle 20R-2 of the rear link, and is used as a third relay point, and the band 18 is stretched upward from the pin 22a as the third relay point. The band 18 (more precisely, free end 18b) is thereby connected to the part 38a of the wire 38.

In Embodiment 2, even if the seat cushion 14 moves up or down, changing its position, both the direction changing member 14-1a and the first relay point (i.e., the axle 20E-1 of the front link) remain at the side frame 14-1 of the seat cushion 14. Hence, the distance "a'" between the first and second relay points 20E-1 and 20E-2 does not change.

Further, the first and second relay points are defined by the axles 20E-1 and 20E-2 (the first and second axles) and are two points on the same component. Therefore, the distance "b'" between the first and second relay points will not change if the front link 20F swings around the second relay point 20E-2.

Still further, the third relay point (i.e., pin 22a) is provided on the support member 22, just like the second relay point (i.e., the axle 20E-2 of the front link, or the second axle). Therefore, the distance "c" between the second and third relay points will not change.

Needless to say, the distance from the top of the side frame to the direction changing member 14-1a and the distance from the third relay point (i.e., pin 22a) to the traction device (pre-tensioner) 30 will not change.

Therefore, that part of the band 18, which extends between the top of the side frame 14-1 and the traction device 30 (namely, the part hanging down along the traction device 30), does not change in length. This is why the length of this part of the band 18 need not be adjusted as the seat cushion is lifted or lowered, in order to pull and stretch the band 18 immediately at an emergency.

The direction changing member 14-1a is provided on the side frame 14-1 and the third relay point (i.e., pin 22a) is provided on the support member 22, respectively. Further, the two axles 20E-1 and 20E-2 (the first and second axles) of the front link are used as the first and second relay points. Still further, the free end 18b of the band 18 extends to the traction device 30, over the direction changing member 14-1a and, the first, second and third relay points. This configuration, though simple, can control the submarine phenomenon.

In both Embodiment 1 and Embodiment 2 of this invention, the distance between the direction changing member and the first relay point will not change if the seat cushion changes in position as it is lifted or lowered, because both the direction changing member and the first relay point are provided on the side frame of the seat cushion as specified above. Nor will change the distance between the first and second relay points, because these relay points are defined by the axle of the link. Hence, the band extending from the direction changing member over the first and second relay points will not change in length, even if the seat cushion is lifted or lowered. The band need not be adjusted in length as the seat cushion is lifted or lowered. The band can therefore be pulled and stretched, irrespective of the height of the seat cushion. The simple configuration, i.e., band 18 having its free end 18b extending from the direction changing member over the first and second relay points on the link, can control the submarine phenomenon.

As describe above, the band 18 does not change in length even if the distance between the seat cushion 14 and the support member 22 changes. The traction device 30 can therefore be secured to the seat cushion 14 or the support member 22 (e.g., seat raiser). That is, the position of the traction device 30 is not limited.

In Embodiment 1 described above, the axles 20R-1 and 20R-2 of the rear link define the first and second relay points. In Embodiment 2, the axles 20E-1 and 20E-2 of the front link define the first and second relay points. Moreover, rotatable links other than the rear and front links coupling the side frame of the seat cushion to the support member may be provided between the side frame and the support member, and may define the first and second relay points. This, however, makes the configuration complex. In order to simplify the configuration, it would be better not to use additional front and rear links, and to use the two axles of the front link 20F or the two axles of the rear link 20R as the first and second relay points, respectively.

Moreover, the direction changing member 14-1a secured on the top-end of the left side frame 14-1 may change the direction of the free end 18-1 from the left-right direction to the front-rear direction directly.

Embodiment 3

A vehicle seat according to still another embodiment (Embodiment 3) of this invention will be described with reference to FIGS. 5A to 5C, FIGS. 6A to 6C and FIG. 7.

As for Embodiment 3, too, the components identical to those of the embodiments described above (Embodiments 1 and 2) are designated by the same reference numbers, and will not be described. The components different from those of the above-described embodiments (Embodiments 1 and 2) will be described in the main.

The embodiment (Embodiment 3) shown in FIGS. 5A to 5C, FIGS. 6A to 6C and FIG. 7 uses a direction changing member 40 of a different type. The direction changing member 40 is composed of a main rod 42 bent in the form of S, and a sub-rod 44 extending straight. Embodiment 3 differs from Embodiments 1 and 2, in that the direction changing member 40, so composed, changes the direction in which a band 18 extends.

The vehicle seat 10 according to Embodiment 3 may not comprise a seat lifter 24 for lifting and lowering the seat cushion 14.

Figure 5A:
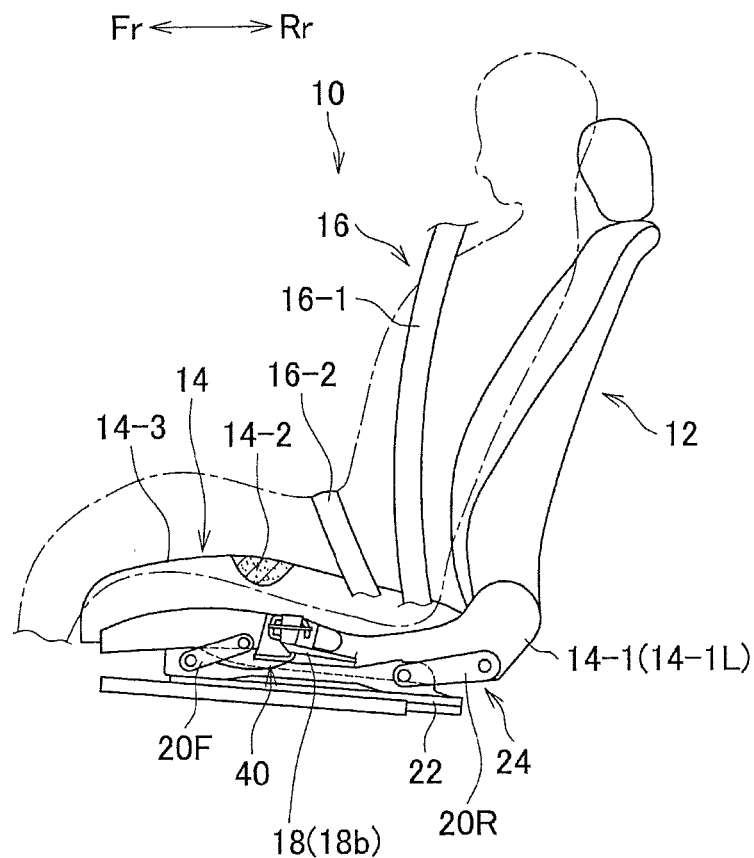
FIG. 5A is a side view of a vehicle seat according to a further embodiment (Embodiment 3) of this invention.
Figure 5B:
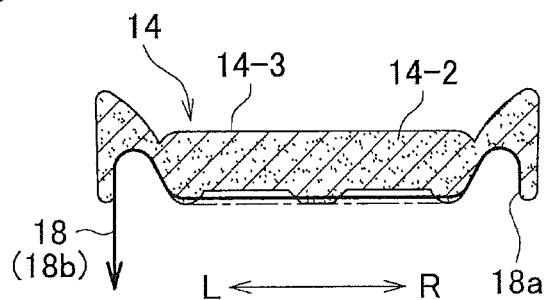
FIG. 5B is a sectional view of the seat cushion of the vehicle seat, which the band is not pulled and stretched between the side frames.
Figure 5C:
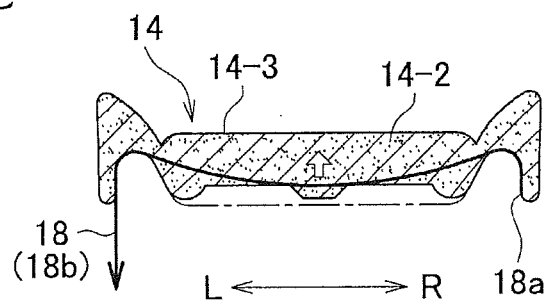
FIG. 5C is a sectional view of the seat cushion of the vehicle seat, which the band is pulled and stretched between the side frames.

As shown in FIG. 5A, the band 18 extends between the left and right side frames 14-1, with its free end 18b hanging along the left side frame 14-1. The direction changing member 40 is provided on one side of the top of the left side frame 14-1. The free end 18b of the band 18 extends over the direction changing member 40 and is led rearwards along the side frame 14-1. The direction changing member 40 changes the direction in which the band 18 extends, from a horizontal direction to a vertical direction. More specifically, the direction is changed from the up-down direction to front-rear direction.

Figure 6A:
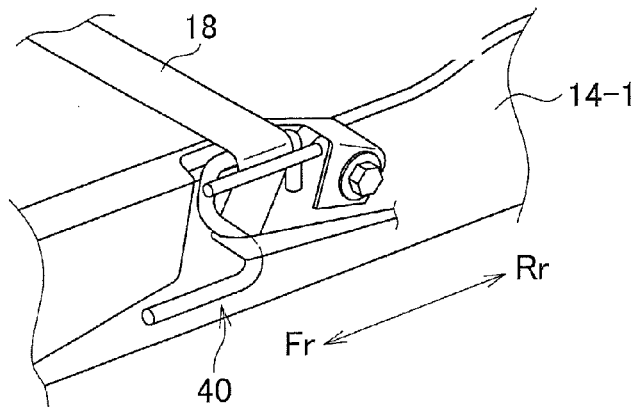
FIG. 6A is a perspective view of a section of the vehicle seat, showing the band pulled and stretched.
Figure 6B:
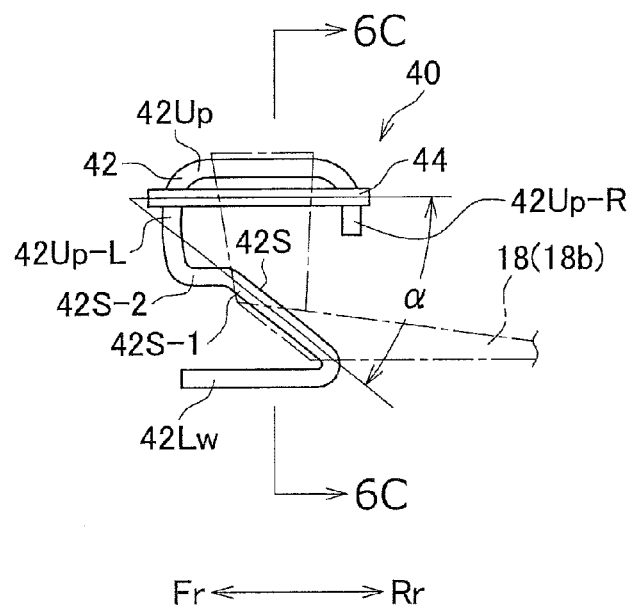
FIG. 6B is a plan view of the direction changing member.
Figure 6C:
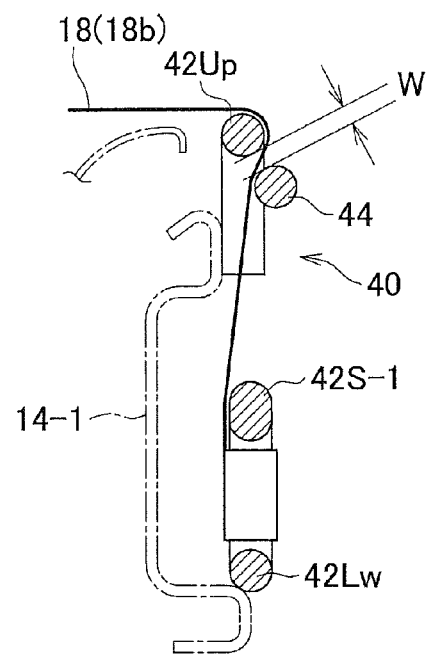
FIG. 6C is a sectional view of the direction changing member, taken along line 6C-6C shown in FIG. 6B.
Figure 7:
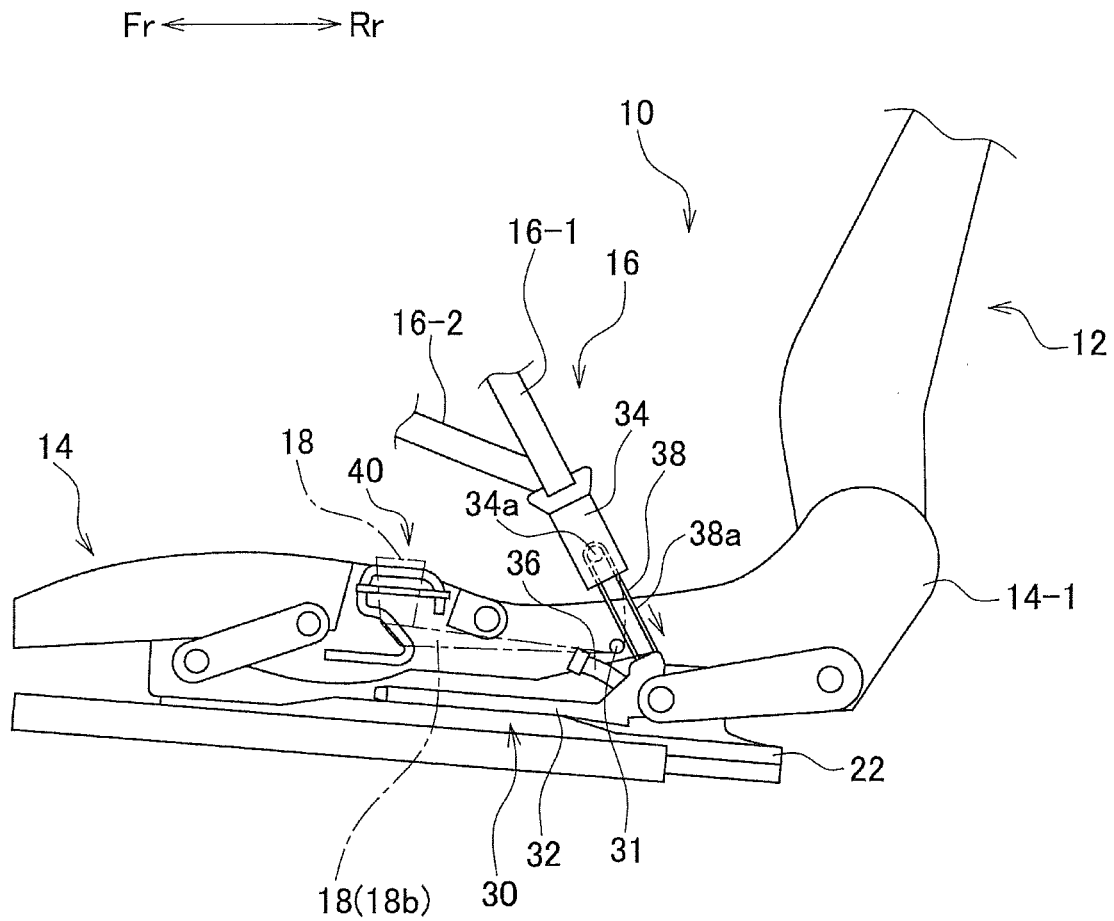
FIG. 7 is a side view of a vehicle seat having a buckle pre-tensioner.

As shown in FIG. 6A to FIG. 6C, the main rod 42 of the direction changing member 40 has been made by bending a wire. The main rod 42 is composed of an upper part 42Up, a lower part 42Lw, and a slant part 42S connecting the upper part and lower part. The slant part 42S has a turn-back strip 42S-1.

To be more specific, the upper part 42Up of the main rod 42 has a left arm 42Up-L and a right arm 42Up-R. The left arm 42Up-L is connected to the upper end of the slant part 42S. The turn-back strip 42S-1 is connected, at lower end, to the lower part 42Lw of the main rod 42. The main rod 42 is, thus, a wire bent in the form of S and is composed of the upper part 42Up, the lower part 42Lw, and the slant part 42S connecting the upper and lower parts 42Up and 42Lw. Further, the turn-back strip 42S-1 extends from the middle part of the slant part 42S to the lower part thereof. An upper half 42S-2 of the slant part 42S extends substantially parallel to the lower part 42Lw. That is, the upper half 42S-2 of the slant part 42S, the upper part 42Up, and the lower part 42Lw extend almost horizontal.

The sub-rod 44 is straight and made of, for example, a wire. The sub-rod 44 bridges the left and right arms 42Up-L and 42Up-R of the upper part 41Up, extends parallel to the upper part 42Up and is spaced from the upper part 42Up with a gap.

As shown in FIG. 6C, the sub-rod 44 is arranged, a little inside with respect to the main rod 42, as viewed in the right-left direction of the vehicle seat.

The sub-rod 44 is not limited to a straight rod made of a wire. The sub-rod 44 only needs to lie, providing a gap between it and the upper part 42Up of the main rod 42, which is wide enough to allow passage of the band 18.

As shown in FIG. 6B, the turn-back strip 42S-1 is straight, crossing with the sub-rod 44 at angle α. The turn-back strip 42S-1 is connected, at upper end, to the upper half 42S-2 of the slant part 42S, and at lower end, to the lower part 42Lw of the main rod 42.

As shown in FIG. 6C, the direction changing member 40 is provided on a line aligned with that part of the band 18, which extends between the left and right side frames 14-1 and on the outer surface of the left side frame 14-1, and below the point at which the free end 18b of the band 18 passes over the top of the left side frame 14-1. The upper part 42Up and lower part 42Lw of the main rod 42 are welded to the outer surface of the left side frame 14-1. That is, the direction changing member 40 is provided on the extension of the band 18 that extends between the left and right side frames 14-1. The band 18 therefore is pulled in the same direction it extends.

The free end 18b of the band passes through the gap "w" between the upper part 42Up of the main rod and the sub-rod 44. The gap "w" is wider than the thickness of the band 18, but does not exceed twice the thickness of the band 18 to prevent the passage of two or more bands. The gap "w" is, for example, 1.2 to 1.9 times the thickness of the band, and is, for example, about 1.5 to 3.0 mm, depending on the thickness of the band.

After passing the top of the left side frame 14-1, the free end 18b of the band extends over the upper part 42Up of the main rod 42, and is guided through the gap between the upper part 42Up of the main rod and the sub-rod 44. Then, the free end 18b of the band is wrapped around the circumferential surface of the turn-back strip 42S-1, from the side frame 14-1 (from inside). Next, the free end 18b of the band changes its direction, from the up-down direction to the front-back direction. The free end 18b of the band then extends backwards along the side frame 14-1.

The free end 18b of the band 18 extends downwards through the gap between the upper part 42Up of the main rod and the sub-rod 44. The direction of the band 18 therefore changes from the left-right direction in the horizontal plane, in which it extends between the left and right side frames 14-1, to the up-down direction in the vertical plane, in which it extends along the left side frame 14-1.

Then, the free end 18b of the band is bent at the turn-back strip 42S-1 of the slant part 42S, and extends backwards along the side frame 14-1. The direction in which the band 18 extends is thereby changed from the up-down direction to the front-back direction in the vertical plane along the side frame, and is then changed from the left-right direction in the horizontal plane to the front-back direction in the vertical plane.

The turn-back strip 42S-1 may intersect with the sub-rod 44 at angle α of 45°. In this case, the direction the band 18 (more precisely, free end 18b) extends can be change by 90°, from the up-down direction to the front-rear direction. The direction need not be changed by 90°, nevertheless. It suffices that the angle α is, for example, 45°±10°.

The sub-rod 44 is secured to the upper part 42Up of the main rod 42, inside the main rod. The band 18 passing through the gap between the upper part 42Up and the sub-rod 44 is guided toward the turn-back strip 42S-1.

So changed in direction by the direction changing member 40, the free end 18b of the band extends to the traction device.

The traction device pulls the band at an emergency such as collision. The buckle pre-tensioner of the seat belt can be used as traction device for pulling the band 18 (more precisely, free end 18b).

The buckle pre-tensioner 30 that may be used as traction device to pull the band 18 is a well-known type. At an emergency such as collision, the buckle pre-tensioner actuates an inflator 46 and pulls the seat belt buckle 34.

The free end 18b of the band may be connected to, for example, that part 38a of the wire 38, which is guided by the pin 34a (i.e., axle of the buckle) back to the pre-tensioner 30. Thus, the free end 18b of the band, which extends from the direction changing member 40 backwards along the left side frame 14-1, is wrapped around a guide pin 31 provided on the left side frame 14-1 and then extends upwards. The free end 18b extending upwards is connected to the part 38a of the wire, right below the buckle 34.

At an emergency such as collision, the inflator 36 is actuated at once, generating high-pressure gas, which flows into the cylinder. The high-pressure gas draws the piston into the cylinder 32 (to the left in FIG. 7). Connected to the piston, the part 38a of the wire 38 is pulled in the direction of the arrow shown in FIG. 7. As a result, the buckle 34 and the free end 18b of the band 18 are pulled at the same time.

Since the pre-tensioner (i.e., buckle pre-tensioner) 30 is used as traction device for the band 18, the shoulder webbing 16-1 and the lap webbing 16-2 are pulled at an emergency, holding the occupant on the vehicle seat 10. If the band 18 is stretched between the left and right side frames 14-1 and the buckle 34 is pulled at the same time, the forward-backward motion of the occupant's buttocks (i.e., submarine phenomenon) can be controlled.

The buckle pre-tensioner 30, which functions as traction device as well, helps to reduce the components of the vehicle seat 10, ultimately simplifying the configuration of the vehicle seat.

The direction changing member 40 is provided on a line aligned with that part of the band 18, which extends between the left and right frames 14-1, and on the outer surface of the left side frame 14-1. The free end 18b of the band extends downwards though the gap between the upper part 42Up of the main rod and the sub-rod 44. So extending through the gap between the upper part 42Up and the sub-rod 44, the free end 18b is pulled in the same direction it is stretched. The band 18 is therefore stretched without twisting even if its free end 18b is pulled by the pre-tensioner (traction device) 30 in an emergency. The band 18 so stretched pushes up the seat pad 14-2 in front of the occupant's buttocks, forming a barrier. The barrier controls the submarine phenomenon at an emergency.

The sub-rod 44 is secured to the upper part 42Up and positioned inside with respect to the main rod 42. The sub-rod 44 therefore pushes the band 18 onto the upper part 42Up while the band 18 is passing through the gap between the upper part 42Up and the sub-rod 44. The band 18 is thereby stretched toward the turn-back strip 42S-1, while reliably wrapped around the upper part 42Up of the main rod 42.

The free end 18b of the band then extends downwards, passing through the gap between the upper part 42Up of the main rod 42 and the sub-rod 44. Then, the turn-back strip 42S-1 changes the direction in which the free end 18b extends, by 90°, from the up-down direction to the front-back direction. Nonetheless, the free end 18b of the band is smoothly turned back, without twisting, at the turn-back strip 42S-1, because the turn-back strip 42S-1 intersects with the sub-rod 44 at angle α of 45°.

Thus, the free end 18b of the band can be pulled without twisting, by the direction changing member 40 which is provided on the side frame 14-1, composed of only the sub-rod 44 and the main rod 42 formed by bending a wire in the form of S and therefore simple in configuration.

The upper half 42S-2 of the slant part 42S extends substantially parallel to the lower part 42Lw of the main rod 42. The upper half 42S-2 need not extend substantially parallel to the lower part 42Lw, however, because it only needs to restrict the forward motion of the band 18.

The free end 18b of the band loosely passes through the gap between the upper part 42Up and the sub-rod 44, and is turned back at the turn-back strip 42S-1 which is straight and a part of the main rod 42. Therefore, the free end 18b is turned back, always at the same position, and is pulled and stretched always in the same direction, not twisting at all. Hence, the position of the traction device 30 is not limited, and the traction device 30 can be arranged in a large region.

Particularly, the turn-back strip 42S-1 is connected at lower end to the lower part 42Lw extending substantially horizontal, and at upper end to the upper half 42S-2 extending also substantially horizontal. Hence, the lower part 42Lw and the upper half 42S-2 of the slant part 42S restrict the motion (front-back motion) of the band 18. This prevents the band 18 from twisting at the turn-back strip 42S-1.

The gap between the upper part 42Up and the sub-rod 44 has width "w" not exceeding twice the thickness of the band 18 to prevent the passage of two or more bands. Hence, even if the band 18 (more precisely, free end 18b) is twisted at the turn-back strip 42S-1, it will not remain twisted between the left and right side frames 14-1, after passing by the direction changing member 40. The band 18 (more precisely, free end 18b) is never stretched, while twisted, between the side frames to push up the seat pad 14-2.

The gap between the upper part 42Up of the main rod and the sub-rod 44 (measured in the front-back direction) is, for example, 1.1 to 1.2 times the width of the band 18, preventing band 18 from moving sidewise. Since the sidewise motion of the band 18 is prevented, the band 18 is stretched, reliably in the same direction as it is pulled.

The direction changing member 40 is provided on a line aligned with the band 18, which extends between the left and right side frames 14-1. The band 18 is stretched, always in the same directed as it is pulled, and can therefore be pulled without twisting. Hence, the position of the traction device 30 for pulling the band 18 is not limited, and the traction device can be arranged in a large region. In any vehicle seat having a seat lifter, the traction device may be secured to the seat cushion or to the support member (e.g., seat raiser).

The direction changing member secured to the side frame is composed of only the sub-rod 44 and the main rod 42 formed by bending a wire in the form of S. The direction changing member is therefore simple in configuration, and can yet serve to pull the band 18, while changing the direction of pulling the band 18 and preventing the band 18 from twisting.

While certain embodiments of the invention have been described, these embodiments have been presented by way of example only, and are not intended to limit the scope of the inventions. Various changes and modifications made within the scope and spirit of the invention can, of course, be included in this invention.

For example, a buckle pre-tensioner is used as traction device for pulling the band. The traction device is not limited to the buckle pre-tensioner, nevertheless. Any device that can pull the band at an emergency can be used instead.

The buckle pre-tensioner may be replaced by a lap pre-tensioner, to pull the band. In this case, the direction changing member of the type used in Embodiment 3 is provided on the side frame (i.e., right side frame) at which the lap pre-tensioner is positioned on a line aligned with the band, which extends between the left and right side frames. The free end of the band extends over the top of the right side frame and then backwards via the direction changing member and along the right side frame, and is connected to the lap pre-tensioner. The band is therefore pulled at the same time the lap webbing is pulled.

In the embodiments described above, the band is fixed at one end, and its other end (free end) is pulled. Instead, the band may not be fixed at either end and can therefore be pulled at both ends. If this is the case, two direction changing members are provided on the left and right side frames, respectively. In this case, two traction devices may be used for pulling each end of the band. Alternatively, only one traction device may be used, in which case one end of the band is connected to the traction device and the other end of the band is connected to a guide pin.

In the embodiments described above, the band extends beneath the seat pad of the seat cushion. The invention is not limited to this configuration. The band may extend in the gap between the trim cover and the upper surface of the seat pad.

What is claimed is:

1. A vehicle seat comprising:
   a seat cushion; and
   a seat lifter configured to lift and lower the seat cushion with respect to a support member provided on a car floor,
   wherein the seat cushion has a seat pad and left and right side frames holding the left and right parts of the seat pad, a band extends below the seat pad and between the left and right side frame, is fastened at one end to one of the side frames and is connected at the other end to a traction device after passing a direction changing member secured to the other side frame so as to change the end of the band in direction, and the traction device pulls and stretches the band at an emergency, pushing up the seat pad;
   the seat lifter includes a first axle secured to the side frame, a second axle secured to the support member, and a link coupling the first and second axles and configured to swing, thereby to lift and lower the seat cushion with respect to the support member; and
   the other end of the band, extending from the direction changing member, is turned back around the first and second axles used as first and second relay points, respectively, and is then connected to the traction device.

2. The vehicle seat according to claim 1, wherein the band is turned back around the second axle and extends through a third relay point.

3. A vehicle seat comprising:
   a seat cushion having a left side frame and a right side frame; and
   a band extending between the left and right side frames and configured to be pulled and stretched between the left and right side frames, at an emergency, thereby to control the forward and sinking motion of the occupant wearing a seat belt,
   wherein a direction changing member is secured to at least one of the right or left side frame and guides the end of the band extending over the top of the side frame so as to change the end of the band in direction;
   the direction changing member comprises a main rod and a sub-rod, the main rod including an upper part and a slant part coupled to one end of the upper part, and the sub-rod extending parallel to the upper part of the main rod, providing a gap between the sub-rod and the upper part of the main rod through which the band passes without falling off; and the slant part of the main rod has a straight turning-back strip for turning back the band loosely passing through the gap between the sub-rod and the upper part of the main rod.

4. The vehicle seat according to claim 3, wherein the turning-back strip of the slant part intersects with the sub-rod at an angle of 45°±10°.

5. The vehicle seat according to claim 3, wherein the turning-back strip is constituted by the lower half of the slant part and the center part thereof, and the upper half of the slant part and the upper part of the main rod extend substantially parallel.

6. The vehicle seat according to claim 3, wherein the upper part of the main rod has a left arm and a right arm, both bend downward at substantially at right angles, and the sub-rod bridges over the left and right arms and is secured to the upper part of the main rod.

7. The vehicle seat according to claim 6, wherein the sub-rod lies inside the main rod, while bridging over the left and right arms.

8. The vehicle seat according to claim 3, wherein the main rod further includes a lower part extending substantially parallel to the upper part and connecting at the lower end of the slant part.

* * * * *